Figure 1:
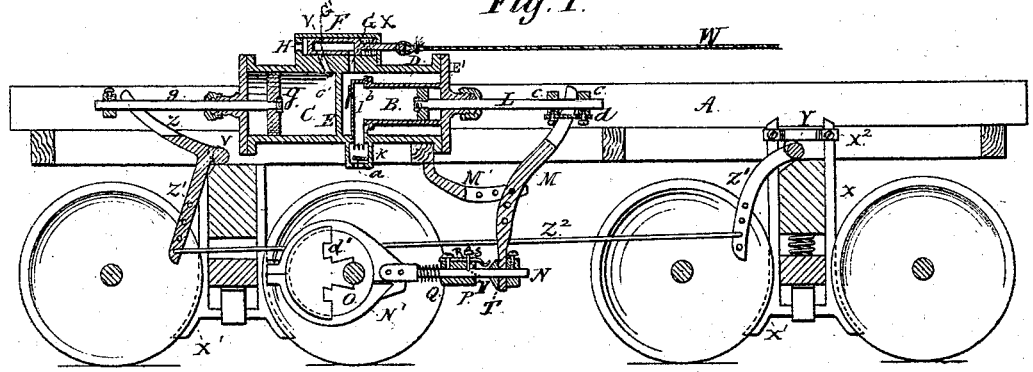

H. E. MARCHAND.
Atmospheric Car-Brakes.

No. 147,416. Patented Feb. 10, 1874.

Witnesses
Wm J Peyton
J M Pool

Inventor
H. E. Marchand
By James L. Norris
Atty

AM. PHOTO-LITHOGRAPHIC Co. N.Y. (OSBORNE'S PROCESS)

UNITED STATES PATENT OFFICE.

HENRY E. MARCHAND, OF PITTSBURG, PENNSYLVANIA.

IMPROVEMENT IN ATMOSPHERIC CAR-BRAKES.

Specification forming part of Letters Patent No. 147,416, dated February 10, 1874; application filed December 8, 1873.

*To all whom it may concern:*

Be it known that I, HENRY E. MARCHAND, of Pittsburg, in the county of Allegheny and State of Pennsylvania, have invented certain new and useful Improvements in Atmospheric Car-Brake, of which the following is a specification:

This invention relates to that class of car-brakes which are operated by atmospheric pressure; and it consists in the combination of a valve or cock having two ports, one communicating directly with a cylinder containing an air-pump, and the other leading into a cylinder containing a piston that is connected with the brakes, said valve being subjected to the action of a spring and of a cord, rope, or chain, in such a manner that when said cord is taut or strained the brakes are taken off, and when the cord becomes slack, either by loosening the same by hand or through the separation of the cars, the brakes are automatically applied by the pressure of the air upon the piston connected with the brakes. The invention further consists of an automatic releasing and engaging device, combined with the connections between the car-axle and the air-pump piston, in such a manner as to connect and disconnect the pump from the axle whenever the pressure in the air-chamber has reached a certain limit. The invention further consists in the combination of a sleeve, a spring, and a bolt or pin with the notched stem of an eccentric, and a lever that operates the air-pump piston, the said pump being operated through the medium of devices which receive their motion from the axle of the car, and so constructed and arranged that whenever a requisite amount of air has been compressed in the receiver, the pressure of the same will act upon the piston, forcing it out beyond its usual stroke, raising the pin or bolt out of the notch of the eccentric-stem, thus disconnecting the sleeve and allowing the stem to reciprocate the sleeve without operating the lever connected with the pump, in which position the pump remains silent until the air pressure has decreased by its utilization in applying the brakes, or otherwise, when the pump-piston is drawn inward, at which instant the pin is forced by the spring into the notch in the eccentric-stem, thus connecting the sleeve with the stem ready for pumping. The invention also consists in forming the brake-cylinder and air-receiver in one piece or casting, the same being separated by a central partition or head, and the latter inclosing the pump-cylinder, so as to form an annular surrounding space or air-receiver. The invention further consists in forming the air-pump cylinder in one piece with its outer head, and in attaching thereto a rear head provided with a valve for admitting air to the surrounding receiver, and with a lower air-port arranged in line with an air-inlet tube in the air-receiver, the pump-cylinder being so constructed otherwise that it may be inserted into the air-receiver, being retained in position by internal flanges and by its outer head, which also forms the head of the air-receiver.

Figure 2:
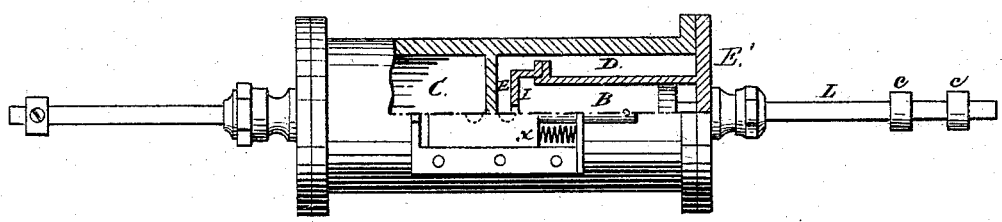
Figure 3:
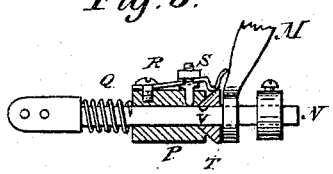
Figure 4:
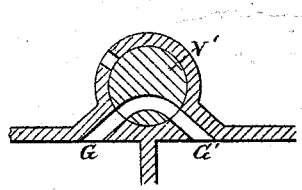
Figure 5:
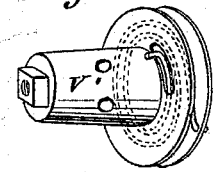
Figure 6:
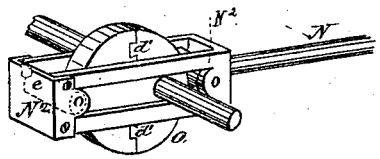
Figure 7:
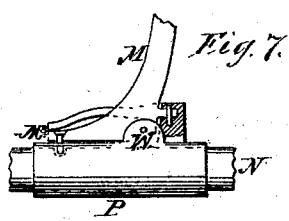

In the accompanying drawings, Figure 1 is a longitudinal sectional view of a car-truck having my improved air-brake mechanism applied thereto. Fig. 2 is a top view of the air-pump, air-receiver, and brake-cylinder, partly in section. Fig. 3 is a detail view of the automatic pump-disengaging devices. Figs. 4 and 5 are detail views of a modified form of air-distributing valve or cock. Fig. 6 is a detail view of the eccentric on the axle and modified form of yoke with its stem; and Fig. 7 is a detail view, showing one of the various modes which may be resorted to for connecting and disconnecting the slide with the reciprocating stem operated by the eccentric.

The letter A designates the ordinary truck and patform of a railroad-car, to which is attached, in any suitable position or place, an air-compressing pump, B, and brake-cylinder C. A cylindrical air-receiver, D, surrounds said pump B, and is generally formed in one piece or casting with the brake-cylinder, a partition or head, E, separating the two from each other. To the air-receiver and brake-cylinder there is applied a valve-chest, F, provided with two ports or openings, G G', communicating, respectively, with the air-receiver and brake-cylinder, and provided also with an additional opening or orifice, H, communicating with the external atmosphere. The cylinder of the air-pump is formed in one piece with its outer head E', said head serving, also, to close the end of the air-receiver, the shell of the pump being arranged within the latter and supported by suitable means in proper respect to the partition E, so as to form a space between its rear head and the partition for the exit of the air from the cylinder. K is a short tubular extension of the air-receiver, which is open at its lower end, and contains a suitable valve, $a$, which is designed to supply fresh air to the pump-cylinder. The upper end of the air-inlet tube K is provided with a serrated or notched inlet-port, communicating with the air-pump cylinder, so as to offer no obstruction to the passage of the air into the latter when the valve $a$ is drawn upward by the suction in the cylinder.

A suitable valve, $b$, is located in the head I of the pump, which serves to permit the escape of the compressed air from the pump-cylinder into the surrounding annular chamber or air-receiver D, but prevents its return to the interior of the pump in the reverse stroke of the piston. L designates the piston and rod of the air-pump, the outer end of said rod being provided with suitable collars $c$ $c$, to which, in the present instance, is applied a plate, $d$, secured in position by set-screws, so as to prevent the piston-rod or collars from turning. M is a lever, centrally pivoted to a suitable bracket or hanger, $M^1$, applied to the car-truck, and provided with a bifurcated upper end, which embraces the piston-rod between the collars $c$ $c$, to hold the piston-rod in position with respect to said lever. Said lever and bracket are provided with a series of holes, so as to enable the lever to be adjusted for varying the stroke of the piston. The lever M will be formed with an eye or opening, through which passes loosely a stem or rod, N, carrying at its rear end a sectional yoke, $N^1$, which fits loosely around an eccentric, O, located on the axle of the car. Said eccentric is composed of two sections or halves, the adjoining faces of which are provided with dovetail tongues and corresponding grooves $d'$, so as to enable the eccentric to be applied to the axle without removing the wheels. Said tongues and grooves interlock when the sections are placed together, and, if desired, set-screws or other suitable means may be employed at the junction of the two halves for preventing their accidental separation. The yoke $N^1$, encircling the eccentric, is made in two parts, hinged at one end, and connected at the other by flanges and bolts.

In some instances I propose to employ an open rectangular frame, $N^2$, as illustrated in Fig. 6 of the drawings, which is to embrace the eccentric and axle, and is provided with friction-rollers $e$ $e$ at its opposite ends, which rollers may be constantly in contact with the periphery of the eccentric, or alternately brought in contact with the same, the action being governed by the length of the bars composing the frame. The journals of the rollers $e$ $e$ are, preferably, loosely mounted in their seats, and subjected to the action of an elastic cushion or spring in their rear, so that the said rollers will bear upon the periphery of the eccentric at all times, and compensate for wear.

The rotation of the car-axles serves, through the medium of the eccentric, to impart a reciprocating movement to the stem or rod N, which will cause the lever M to be vibrated upon its fulcrum, for reciprocating the air-pump piston. The air, entering the cylinder of said pump through the valve $a$, is compressed by the movement of the piston, and passes out through the valve $b$ into the surrounding air-receiver or cylinder D.

I provide means for automatically disengaging the pump mechanism when a requisite amount of air-pressure is attained in the cylinder, so as to prevent injury to the operating mechanism, and their disengagement I propose to effect in various ways, depending, in every instance, however, upon the air within the cylinder, after the same has been compressed to the desired extent, for accomplishing the desired result.

It will be perceived that when the air is compressed to the limit which the cylinder and receiver is supposed to carry, that it will force the piston toward the outer head of the pump, thus throwing the lower end of the lever in a rearward direction, causing it to release a disengaging or clutch mechanism constructed substantially as hereinafter described.

Upon the stem or rod N, deriving a reciprocating motion from the eccentric on the car-axle, there is arranged a sleeve, P, in rear of which, encircling the stem, is located a spiral or other spring, Q, which exerts a constant forward pressure upon the sleeve, for causing a catch or bolt, S, carried by a bent-spring tongue, R, to enter a notch or opening, $r$, in the stem N.

When the air-pump is in action to compress the requisite amount of air, said sleeve is locked to the stem, as above described, but as soon as the limit of the air-pressure is reached in the receiver, the outward movement of the piston will exceed its usual stroke, forcing outwardly the upper end of the lever and inwardly the lower end to a greater extent than when pumping, said lower end of the lever then pressing upon a cam or cone-shaped collar, T, with greater force than usual, by reason of the increased resistance of the air in the receiver, thus raising the spring, which has a sufficient tension to act on the pump-lever under ordinary circumstances, and with it the coupling-pin from the notch in the stem N, hence disengaging the sleeve P, forcing it back on the stem, and covering or passing over the notch, the stem being left free to reciprocate through the eye of the lever, said lever and piston remaining silent. In this position the sleeve is held on the stem with the spring Q compressed, and the locking-bolt out of the notch, until the pressure of the lever is removed by a decrease of the air-pressure in the receiver, due to its discharge in applying the brakes, when the spring Q forces the sleeve and cam with the lever outwardly upon the stem, and the pin then automatically engages with the notch in the stem and locks the sleeve in position ready to vibrate the lever and reciprocate the piston for charging the air-receiver. The cone or cam shaped collar, when employed for disconnecting the sleeve from its stem, is made of such a shape, and relatively arranged in respect to the spring-tongue of the catch-bolt, that it will raise the same to a sufficient extent, and yet only engage with the front extremity of the same, so as to prevent it from being locked or retained by the spring in contact with the sleeve when the pump-operating lever vibrates forward, due to the removal of the air-pressure in the receiver, as it is essential that said cone shall be impelled forward by the spring-pressed sleeve for permitting the bolt to enter its receiving-notch at the very moment that the air-pressure is removed from the receiver, so that the pumping action may instantly occur.

As a modification of the relieving mechanism, I propose to employ for accomplishing the same result a pump-operating lever, the lower end of which is hinged or pivoted directly to the slide P, as shown at $w$ in Fig. 7 of the accompanying drawings, said lever being provided with a toe or horizontal prolongation, $M^3$, which is arranged in such respect to the spring-tongue R and catch-bolt S that, when the air-pump is in action and the operating-lever in the position incidental to the pumping operation, the spring-tongue, which either carries or bears upon the catch-bolt, will retain the same in the notch in the stem until the moment when the air-pressure has forced the piston-rod outward to its full extent, when the lever will turn or rock upon its lower fulcrum-point, thus elevating the toe of the same, and, consequently, raising the catch-bolt from the notch in the stem, and retaining it in this elevated position, the stem simply reciprocating through the sleeve until the pressure in the cylinder is lessened by discharging the air in applying the brakes, when the catch-bolt is immediately restored to its original position for again locking the sleeve to the stem for vibrating the lever to reciprocate the pump-piston.

As my invention depends upon the employment of a taut cord or chain for removing the brakes, and of a loosened cord for applying the same, I propose to combine with the air-receiver D and brake-cylinder C a valve, V, which is provided with two ports, which are caused to communicate with the ports leading into the air-receiver and brake-cylinder, so as to convey air from the former into the latter for operating the brakes through the medium of a piston, $g$, operating in said brake-cylinder. The valve V is made hollow, as shown, so as to receive the air within the same through one port and to discharge it through the other into the brake-cylinder. The series of valves throughout the entire length of the train are connected together by means of a cord, chain, rope, or rod, W, the forward end of which is conducted to the engineer's cab, or other suitable place, where it is secured. Said cord, chain, rope, or rod W may be conducted and guided under, over, or at the sides of the car or cars, either upon the inside or outside, and is connected between each car by suitable connections, so as to be in a taut or strained condition, the front end being attached to a spiral, coiled, or other spring carried by a lever arranged in the engineer's cab, which spring will compensate for the motion of the cars, and retain the cord or rope in a taut or strained condition, so that when the cord or rope is in such strained state, the brakes taken off the wheels, no air is admitted to the brake-cylinder; but as soon as the cord is loosened, either by the engineer or through the separation of the cars, the valve is automatically brought into position for delivering air to the brake-cylinder by means of a spring, $x$, which encircles the stem, or is otherwise arranged in respect to the valve, and the pressure of which is so regulated as to throw the valve into the proper position when the cord is separated or severed, from any cause whatever.

In view of the fact that a supply of air always exists in the air-receiver and pump, means are provided for readily and effectually applying the brakes almost instantaneously and with security, certainty, and comparative ease and facility. As each car is provided with an air-reservoir and brake-chamber, the force of the air is not lost by transmission through pipes.

Instead of the slide-valve above described, I may employ a rotary valve or two-way cock, V', (shown in Figs. 4 and 5,) arranged and operating in the same manner as the slide-valve, but provided with a grooved face-plate, for receiving and guiding the rope or cord, and with a coiled spring for turning the same.

The brakes are removed as soon as the valves are turned or moved to arrest the air-supply, as the exhaust air then passes out of the brake-cylinder through the end opening H, in the valve-chest.

In connection with the air-compressing and relieving devices, as above described, any known form of construction of brake mechanism will be employed, and I have exemplified, in the present instance, a rising and falling brake, which operates in a satisfactory manner. These brakes are arranged between the wheels of the truck, and are composed of two rising and falling bars, X, moving in suitable guides, and formed in one piece with brake-shoes $X^1$, or the latter may be separate and pivoted to the lower ends of said bars. The upper ends of the latter are connected by a horizontal bar or plate, $X^2$, against which bears a transverse rock-shaft, Y, carrying cams or projections, which, when properly presented by the movement of the rock-shaft, will raise the bars X to apply the brake-shoes to the wheels.

The rock-shaft employed in connection with the wheels at the end of the car, where the brake-cylinder is located, is provided with lever-arms Z Z', connected respectively with the piston-rod, and with the other rock-shaft at the opposite end of the car, by a connecting-rod, Z''.

A rising and falling brake, constructed according to the plan proposed by me, and receiving the direct pressure of the operating devices or rock-shaft, will be more effective and reliable in use than the brakes heretofore known, for the reason that only a limited movement of the brake-shoes is requisite to apply the same to the wheels, or to remove them from the latter, and, furthermore, the rock-shaft bearing directly upon the bars or frame of the shoes, no power is lost by transmission through intermediate devices.

An atmospheric car-brake constructed according to the present invention, is deemed to be extremely qualified for arresting the movement of trains of cars with dispatch and certainty, and as each car is provided with a constant supply of air under pressure, no danger need be apprehended when any of the cars separate, for they are immediately stopped by the release of the valve mechanism, which causes the air to instantly act upon the brake mechanism for applying the same to the wheels; and, further, if a car be accidentally detached, and not have the requisite amount of air compressed in the reservoir to apply the brakes, the pumping action will continue while the car is running, and thus charge the reservoir, and from thence pass into the brake-chamber and apply and retain the brakes in such position.

Having thus fully described my invention, what I claim as new, and desire to secure by Letters Patent, is—

1. A valve having two ports, one communicating directly with a cylinder containing an air-pump, and the other leading into a cylinder containing a piston connected with the brakes, combined with said cylinders, and with a spring to place said valve in a position to connect the cylinders when it is released for applying the brake, substantially as described.

2. An automatic releasing and engaging device, combined with the connections between the car-axle and the pump-piston, substantially as described.

3. The combination of a sleeve and a bolt or pin with the eccentric, its notched rod, spring R, and the lever that operates the pump-piston, substantially as described, for the object specified.

4. The brake-cylinder and air-receiver, formed in one piece, in combination with the air-pump cylinder formed with the head of the casing, substantially as described.

5. The brake-cylinder, air-receiver, and air-pump cylinder, combined in one and the same casing, substantially as described.

In testimony that I claim the foregoing I have hereunto set my hand this 6th day of December, 1873.

HENRY E. MARCHAND.

Witnesses:
   JAMES L. NORRIS,
   WM. J. PEYTON.